(12) United States Patent
Westbrook

(10) Patent No.: US 7,010,195 B2
(45) Date of Patent: Mar. 7, 2006

(54) FIBER OPTIC GRATING WITH TUNABLE POLARIZATION DEPENDENT LOSS

(75) Inventor: Paul Westbrook, Chatham, NJ (US)

(73) Assignee: Fitel USA Corp., Norcross, GA (US)

( * ) Notice: Subject to any disclaimer, the term of this patent is extended or adjusted under 35 U.S.C. 154(b) by 420 days.

(21) Appl. No.: 10/099,212

(22) Filed: Mar. 15, 2002

(65) Prior Publication Data

US 2003/0185510 A1 Oct. 2, 2003

(51) Int. Cl.
*G02B 6/34* (2006.01)
*G02B 6/27* (2006.01)

(52) U.S. Cl. .............................. 385/37; 385/28; 385/48
(58) Field of Classification Search .................. 385/28, 385/11, 37, 48, 124, 136; 356/364–367
See application file for complete search history.

(56) References Cited

U.S. PATENT DOCUMENTS

| | | | |
|---|---|---|---|
| 4,021,099 A * | 5/1977 | Kawasaki et al. ............ | 385/35 |
| 4,606,605 A | 8/1986 | Ashkin et al. | |
| 5,561,726 A | 10/1996 | Yao | |
| 5,647,039 A * | 7/1997 | Judkins et al. ................ | 385/37 |
| 5,694,512 A | 12/1997 | Gonthier et al. | |
| 5,809,184 A | 9/1998 | Doerr et al. | |
| 5,822,487 A | 10/1998 | Evans et al. | |
| 5,832,156 A * | 11/1998 | Strasser et al. ................ | 385/48 |
| 5,982,962 A * | 11/1999 | Koops et al. .................. | 385/37 |
| 5,986,808 A | 11/1999 | Wang | |
| 6,035,082 A * | 3/2000 | Murphy et al. ................ | 385/37 |
| 6,118,539 A | 9/2000 | Gaumont et al. | |
| 6,198,557 B1 * | 3/2001 | Dultz et al. .................. | 398/102 |
| 6,205,262 B1 | 3/2001 | Shen | |
| 6,211,957 B1 | 4/2001 | Erdogan et al. | |
| 6,211,962 B1 | 4/2001 | Nolan | |
| 6,236,782 B1 | 5/2001 | Kewitsch et al. | |
| 6,310,720 B1 | 10/2001 | Walker et al. | |
| 6,347,164 B1 | 2/2002 | Rudkevich | |
| 6,396,983 B1 * | 5/2002 | Atkins et al. .................. | 385/37 |
| 6,459,834 B1 * | 10/2002 | Kim et al. ..................... | 385/37 |
| 6,501,881 B1 * | 12/2002 | Kim ............................. | 385/37 |
| 6,766,080 B1 * | 7/2004 | Ohmura et al. ............... | 385/37 |
| 6,832,023 B1 * | 12/2004 | Gaylord et al. ............... | 385/37 |
| 6,870,991 B1 * | 3/2005 | Ohta et al. ..................... | 385/50 |

FOREIGN PATENT DOCUMENTS

EP   1133083 A2 *  9/2001

* cited by examiner

*Primary Examiner*—Layla G. Lauchman
*Assistant Examiner*—Sang H. Nguyen

(57) ABSTRACT

A tunable polarization dependent loss element is formed of a fiber including a highly tilted optical grating. The grating is formed at an angle of approximately 45° so as to preferentially scatter one polarization state out of the fiber core while allowing the remaining, orthogonal polarization to propagate unimpeded. By twisting the ends of the fiber grating structure, the orientation of the grating with respect to the fiber optical axis will be changed, modifying the amount of optical signal existing in each polarization state. In one embodiment, both ends may be rotated in the same direction through the same angular displacement, resulting in merely rotating the principle states of polarization in the fiber. Alternatively, the ends of the grating may be rotated (twisted) in opposite directions so as to couple all of the light signal into a single polarization state, reducing the amount of polarization dependent loss to essentially zero. Therefore, by controlling the twist imparted to the grating, the amount of exhibited polarization dependent loss can also be controlled.

29 Claims, 5 Drawing Sheets

FIBER OPTIC GRATING WITH TUNABLE POLARIZATION DEPENDENT LOSS

TECHNICAL FIELD

The present invention relates to fiber grating structures and, more particularly, to a fiber grating structure that is capable of imparting tunable polarization dependent loss into an optical communication system.

BACKGROUND OF THE INVENTION

Many components used in fiber optic communication systems impart a partial polarization onto the optical signal propagating along the fiber and through the components. This characteristic is often defined as "polarization dependent loss" (PDL) and is considered an undesirable property since PDL can lead to amplitude modulation distortion in analog communication systems and increased bit error rate in digital communication systems. A further problem is that PDL is often a dynamic quantity, as a result of separate losses associated with concatenated components, as well as the fact that the optical fiber connecting components may randomly transform the polarization of the optical signal. This random transformation is affected by external conditions such as temperature and the stress on the fiber, which may vary with time.

In order to mitigate the deleterious effects of PDL, it is necessary to be able to accurately measure, simulate, and (if necessary) compensate for PDL. For all of these applications, it is desirable to have a device that can produce a specified amount of PDL. In order for a PDL device to be useful, it must have two properties: (1) the value of the polarization dependent loss itself must be "tunable"; and (2) the principle states of polarization (PSP) (i.e., the polarization states of maximum and minimum insertion loss) must also be tunable. In order to achieve these two properties, most tunable PDL schemes utilize a PDL element with variable loss (but fixed polarization states) in conjunction with a polarization controller disposed at the input of the PDL. The polarization controller allows for the PSP to be varied at the input of the PDL element, thus meeting the first requirement.

Although this arrangement addresses the needs, such arrangements may require two or more such PDL elements to be concatenated to provide truly "tunable" PDL. Moreover, polarization control devices are relatively expensive and exhibit high insertion loss. Further, tunable PDL elements that exist in the prior art, such as that disclosed in U.S. Pat. No. 6,347,164 require the use of bulk optic components (e.g., lenses) that are large and unstable.

SUMMARY OF THE INVENTION

The need remaining in the prior art is addressed by the present invention, which relates to fiber grating structures and, more particularly, to a fiber grating structure that is capable of imparting tunable polarization dependent loss into an optical communication system.

In accordance with the present invention, a "highly tilted" optical grating is formed so as to exhibit a blaze (tilt) angle on the order of 45° with respect to the optical axis. The utilization of such a blaze angle in the grating structure results in the grating functioning as a polarizer that preferentially scatters light of one polarization out of the fiber core and into the cladding region. The greatest polarization scattering occurs for core-guided modes with wavelengths that are coupled orthogonally out of the core. In particular, the condition required for this orthogonal out-coupling can be expressed as follows:

$$\lambda_{orthogonal} = n_{eff} \lambda_{grating}$$

where $\lambda_{orthogonal}$ is defined as the vacuum wavelength of the core-guided light, $n_{eff}$ is the effective refractive index of the core-guided mode, and $\lambda_{grating}$ is the period of the grating. The orientation of the principle states of polarization (PSP) depends on the orientation of the grating with respect to the optical axis and can be changed in accordance with the present invention by mechanically twisting the fiber about the optical axis. When both ends of the grating are rotated in the same direction through the same rotation, the polarization dependent loss (PDL) remains constant and the orientation of the PSP is rotated. When the rotations are equal and opposite, the PDL is reduced to a minimal level. Different twists applied to the two ends of the fiber thus impart different amounts of PDL to the optical signal propagating through the grating. The addition of birefringent fiber allows for a full range of PSPs to be exhibited by the device.

A tunable PDL element of the present invention may be easily incorporated into larger fiber-based systems. For example, a tunable PDL element may be used in association with a fiber-based polarization controller or in-line all-fiber polarimeter. Advantageously, the separate elements may be formed along the same section of optical fiber so as to maintain essentially identical optical characteristics between the output of the first device (e.g., polarimeter or polarization controller) and the input of the second device (tunable PDL element).

Various embodiments of the present invention, as well as other advantages and variations, will be more fully understood by reference to the following description and the accompanying drawings.

BRIEF DESCRIPTION OF THE DRAWINGS

Referring now to the drawings.

DETAILED DESCRIPTION

Figure 1:
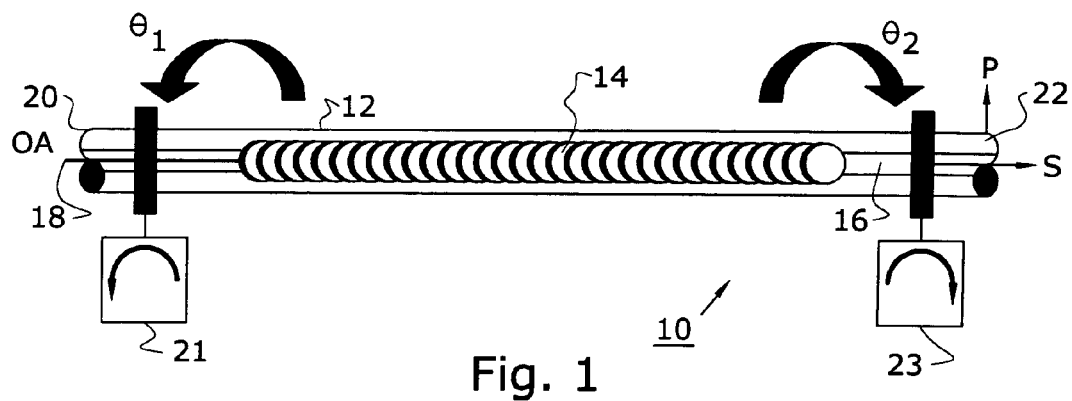
FIG. 1 illustrates an exemplary tunable PDL element formed in accordance with the present invention, illustrating an arrangement for rotating the principle states of polarization.

FIG. 1 illustrates an exemplary tunable PDL element 10 formed in accordance with the present invention. Tunable PDL element 10 comprises a section of optical fiber 12, with a highly tilted grating 14 formed in the core region 16 of fiber 12. It has been found that tilting grating 14 at an angle of approximately 45° with respect to optical axis 18 results in preferentially scattering light of a first polarization state (for example, the "s" polarization) out of core region 16, while allowing the remaining, orthogonal polarization state (for example, the "p" polarization) to propagate unimpeded through grating 14. The algebraic "difference" between the maximum and minimum transmission is defined as the grating polarization dependent loss (PDL). Polarization dependent loss (PDL) may also be defined in logarithmic terms (in units of dB) as follows:

$$PDL = 10 \, \log_{10}(T_{max}/T_{min}),$$

where $T_{max}$ is defined as the "maximum transmission" and $T_{min}$ is defined as the "minimum transmission". The particular orientation of the principle "s" and "p" polarization states is therefore a function of the orientation of grating 14 along optical axis 18. Various methods, well-known in the art, may be used to write grating 14 into fiber 12, such as an interferometric technique using UV radiation and a properly oriented and positioned phase mask. In the limit where the PDL of the grating is very large, such a device becomes useful as a polarizing element, where PDL values for polarizers are PDL>20 dB.

In accordance with the present invention, the orientation of grating 14 along optical axis 18 may be changed by mechanically twisting one or both of the opposing ends 20 and 22 of fiber 12. A pair of rotatable chucks 21 and 23 may be used to clamp opposing ends 20 and 22 of fiber 12 and provide the desired degree of rotation to either end. In the particular arrangement as illustrated in FIG. 1, both end 20 and end 22 are rotated in the same direction, that is, first end 20 is rotated through a positive angle $\theta_1$ (i.e., upward out of the plane of the drawing) and second end 22 is rotated through a positive angle $\theta_2$ (also out of the plane of the drawing). In the case where $\theta_1 = \theta_2$, the entire fiber is subjected to a simple rotation. In this case, the PDL of element 10 remains fixed and the orientation of the principle states of polarization ("s" and "p") are simply rotated. It is to be noted that the polarization provided by element 10 is always linear, since the grating functions as a polarizer to scatter one state of polarization out of the direction of the signal propagation along optical axis 18. When $\theta_1 \neq \theta_2$, then grating 14 itself exhibits a changing tilt angle, resulting in a changing principle state of polarization along the length of the grating, thus decreasing the amount of PDL present in element 10. This difference in twist thus allows for PDL element 10 to be "tunable" in terms of its PDL. It is to be understood that in any arrangement of the present invention, one end may remain fixed (i.e., $\theta_i = 0$) while the other is rotated to impart the desired change in polarization dependent loss.

Figure 2:
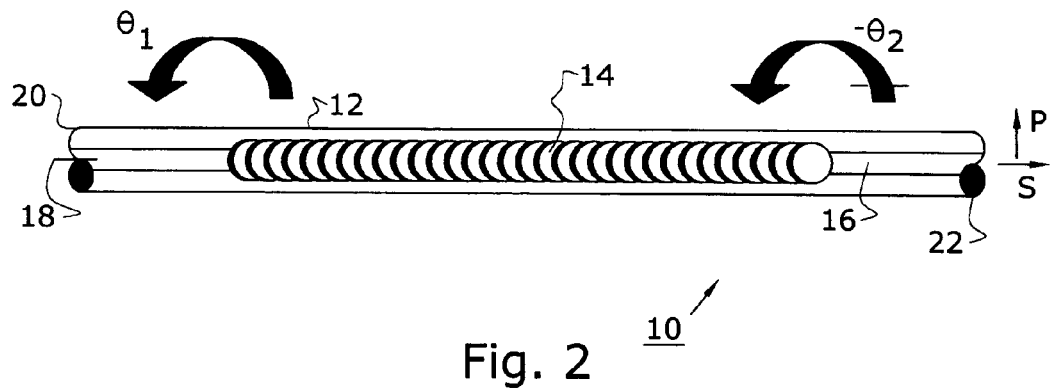
FIG. 2 illustrates an exemplary tunable PDL element of the present invention, using equal and opposite twists at each end of the grating to tune the PDL within the grating.

FIG. 2 illustrates PDL element 10, as discussed above, under the condition where the rotations imparted to ends 20 and 22 are applied in opposing directions (as indicated by the "minus" sign associated with $\theta_2$). In this case, when the rotations are equal in magnitude but opposite in direction, the orientation of grating 14 within element 10 remains essentially fixed (as do the principle states of polarization), but the PDL present in element 10 decreases. This change in PDL occurs since, as the case when $\theta_1 \neq \theta_2$, the orientation within grating 14 is constantly changing along optical axis 18, resulting in crossing one propagating polarization state over to the other. In the case where a rotation difference of 180° is present between $\theta_1$ and $\theta_2$ (e.g., $\theta_1 = +90°$ and $\theta_2 = -90°$), the polarization dependent loss can be reduced to approximately zero.

An additional improvement to the fiber grating PDL element of the present invention can be made by adding an index-matching material on the outside of the fiber. A fiber grating formed in bare fiber typically exhibits resonances in its transmission spectrum, due to resonances resulting from reflections at the air-fiber interface. These resonances may also appear in the PDL value of the grating, since the resonance structure is typically polarization dependent. By adding an index-matching material, such resonances can be reduced to a very low value, thus also reducing the PDL variation as a function of wavelength to a relatively low value. The most common method of applying an index-matching material is to coat the fiber with a curable index-matched polymer. In fact, any change at the surface of the fiber which significantly reduces the reflection of light will reduce the resonance structures in the tunable PDL element of the present invention. Such changes include adding a scattering material, or an absorber, at the surface of the fiber.

Figure 3:
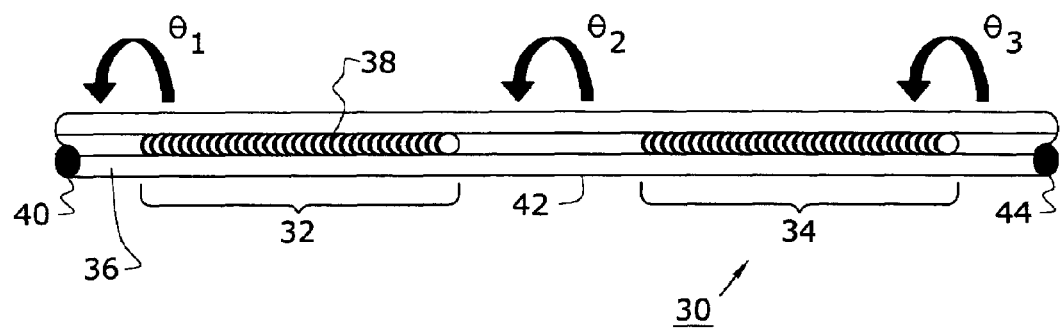
FIG. 3 illustrates an arrangement of the present invention utilizing a pair of cascaded tunable PDL elements.

The concept of rotating a highly tilted fiber optic grating to form a tunable polarization dependent loss (PDL) element can be extended to an embodiment comprising two or more such PDL devices. FIG. 3 illustrates an exemplary tunable PDL device 30 which comprises a pair of concatenated PDL elements 32 and 34, formed in a continuous section of optical fiber 36. As shown, PDL element 32 includes a highly tilted grating 38, which may be rotated at a first end 40 through an angle of $\theta_1$ to provide an adjustment of either the principle states of polarization, the polarization dependent loss, or both. The adjustment provided in first PDL element 32 is effected by the rotation to fiber 36 provided at both first end 40 (denoted by $\theta_1$) and midpoint 42 (denoted by $\theta_2$), where midpoint 42 is defined as the conjunction region between first PDL element 32 and second PDL element 34. In a similar fashion, the tunability applied to both the PSP and PDL is further affected by the rotation of fiber 36 within second PDL 34, as rotated by midpoint 42 and second fiber end 44 (the rotation at second end 44 denoted by $\theta_3$).

By combining several PDL elements, the overall device will have redundancy in the number of configurations of angles that produce the same PDL and PSP. This allows for one or more of the angles to be "unwound" when it reaches a fiber twist limit. The other twist angles are then used to compensate for the PDL of the unwound element. As a result, the variable PDL is more likely to provide "endless" PDL variations without the need for sudden changes in a given angle after a particular fiber has been twisted beyond its limit.

Figure 4:
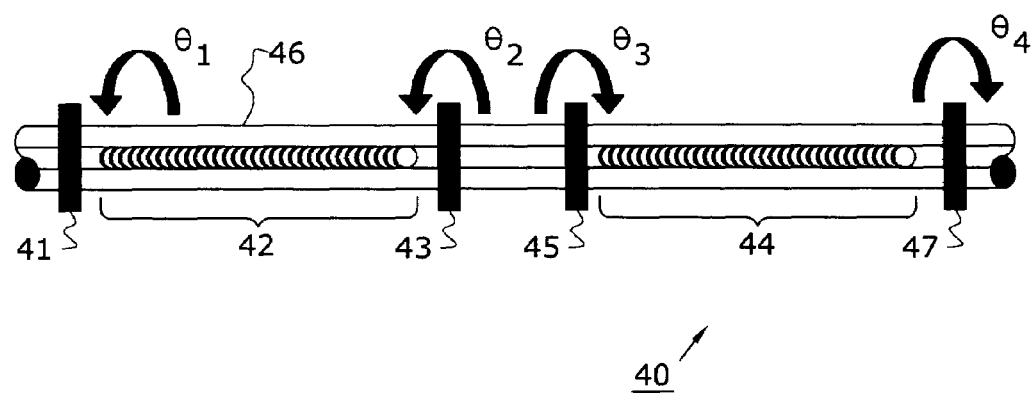
FIG. 4 illustrates an alternative embodiment of the arrangement of FIG. 3, utilizing separate actuators for applying twist to each separate grating section.

FIG. 4 illustrates an arrangement 40 that utilizes four separate rotation elements to provide two independent twists between a pair of PDL elements 42 and 44. Such a device allows for independent control of the PDL and PSP for each element. In particular, a first pair of rotation elements 41 and 43 are disposed at either end of a first PDL element 42, with rotation element 41 disposed at a first end 46 of first PDL element 42 and rotation element 43 disposed at an opposing end 48 of first PDL element 42, the location of rotation element 41 being along a mid-region between first PDL element 42 and second PDL element 44. In a similar manner, a first rotation element 45 is also disposed in this mid-region, so as to rotate a first end of second PDL element 44. A second rotation element 47 is attached to the output end 48 of second PDL element 44. In this arrangement, by using a pair of rotation elements 43, 45 at the mid-point between the two PDL elements, the orientation of each grating may be controlled independently, providing an increased degree of control of both PDL and PSP along the device.

Figure 5:
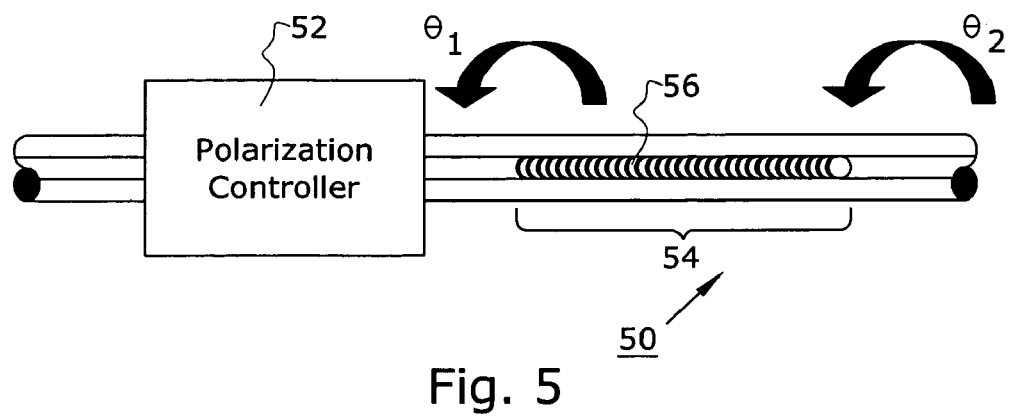
FIG. 5 illustrates an alternative embodiment of the present invention utilizing a polarization controller element disposed at the input to a tunable PDL element.

It is also possible to combine a tunable PDL element as discussed above with a polarization controller element, as shown in FIG. 5, to provide an arrangement 50 which provides a range of various PDL values and any possible principle state of polarization (linear, elliptical, circular, etc.). An exemplary polarization controller 52 may comprise any structure well-known in the art to provide a means of accepting an input optical signal of any, random polarization state and providing as an output a signal having a known polarization state, which may be a linear polarization state or an elliptical polarization state. A tunable PDL element 54 is disposed at the output of polarization controller 52 and functions, in the manner described above, to impart an adjustable degree of polarization dependent loss to the optical signal passing therethrough. As shown, tunable PDL element includes a highly tilted grating 56 and is mounted (not shown) so as to be rotated through an angle $\theta_1$ at the interface between polarization controller 52 and tunable PDL element 54, and through an angle $\theta_2$ at opposing end 58 of arrangement 50. Arrangement 50, therefore, would be able to accept an input optical signal having any polarization state and be capable of providing tunable polarization dependent loss, as described above.

Figure 6:
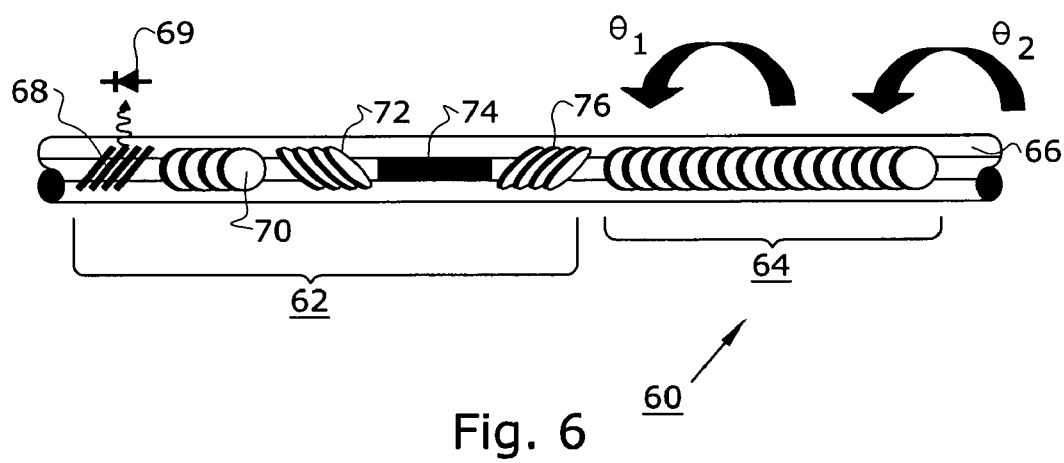
FIG. 6 illustrates an embodiment of the present invention utilizing an in-line all-fiber polarimeter disposed at the input to a tunable PDL element.

FIG. 6 illustrates yet another embodiment of the present invention, this particular arrangement 60 comprising an in-line all-fiber polarimeter 62 and a tunable PDL element 64 formed along a single section of optical fiber 66. Polarimeter 62 is similar in form and function to that disclosed in U.S. Pat. No. 6,211,957, which utilizes a series of gratings and a wave plate to completely define the "state of polarization" (SOP) for an optical signal passing through the polarimeter. In particular, polarimeter 62 comprises a first grating 68, where a predetermined intensity of the beam will be out-coupled by grating 68 and measured by an associated detector 69. The remaining portion of the beam then encounters a second grating 70, rotated 90° with respect to first grating 60, and will thus out-couple a portion of the orthogonally polarized signal. A third grating 72 is oriented at an angle of 45° with respect to both first grating 68 and second grating 70. A quarter-wave plate 74 is disposed at the output of third grating 72 and is oriented at an angle of 0° to convert linearly polarized light at 45° to circularly polarized light. Upon exiting quarter-wave plate 74, the beam impinges a fourth grating 76 oriented at 135°. Each grating has an associated detector, such that the out-coupled light from each grating allows for all four Stokes parameters to be measured and the SOP to be accurately determined. By including tunable PDL element 64 at the output of polarimeter 60, the ends may be twisted through angles $\theta_1$ and $\theta_2$ to provide adjustment of the polarization dependent loss, as a function of the SOP of the optical signal measured by polarimeter 62.

Figure 7:
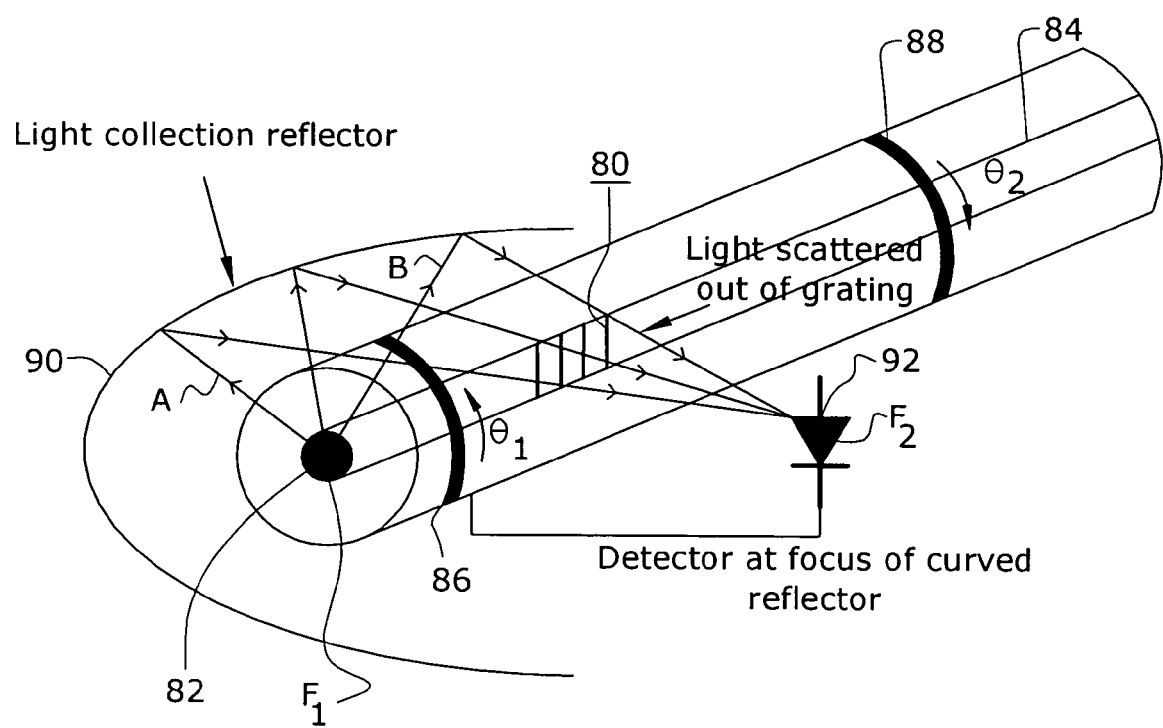
FIG. 7 illustrates an embodiment of the present invention incorporating a detection device with the tunable PDL element, useful for extracting polarization information about the signal passing through the PDL element.

Another embodiment of the present invention, as shown in FIG. 7, adds one or more detectors to capture at least a portion of the light exiting the fiber via the grating. Detection of this out-coupled light allows deduction of the polarization properties of the optical signal propagating along fiber core. These properties include the amount of PDL correction applied using one or more rotation elements to impart fiber twist, as well as the fraction of light lying in one or more polarization states. In particular, FIG. 7 illustrates an exemplary tunable PDL element 70 lying within the core region 72 of an optical fiber 74. A pair of rotation elements 76 and 78 are used to impart twist to fiber 70 so as to "tune" the amount of polarization dependent loss, where rotation element 76 imparts a rotation of $\theta_1$ to a first end of PDL element 70 and rotation element 76 imparts a rotation of $\theta_2$ to the opposing end of PDL element 70. An elliptical mirror 80 is disposed alongside of fiber 74 and positioned such that core region 72 is at one focal point $F_1$. A detector 82 is positioned at the other focal point $F_2$ so as to advantageously capture the light beams out-coupled along PDL element 70. Detector 82 can therefore be used to measure the amount of polarization dependent loss present in the signal. Preferably, detector 82 may be coupled to one or both of rotation elements 76, 78 and provide "correction" control signals to these rotation elements to modify the amount of measured polarization dependent loss, as need be. The reflective mirror may so be parabolic, or may be designed to direct all of the light onto a single detector.

Figure 8:
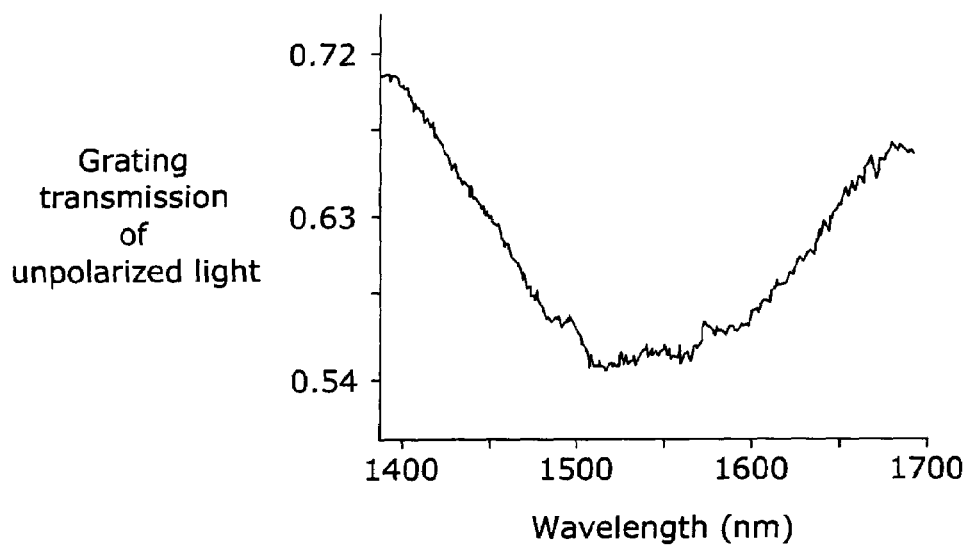
FIG. 8 is graph showing the grating transmission spectrum for unpolarized light through an exemplary tunable PDL element of the present invention.
Figure 9:
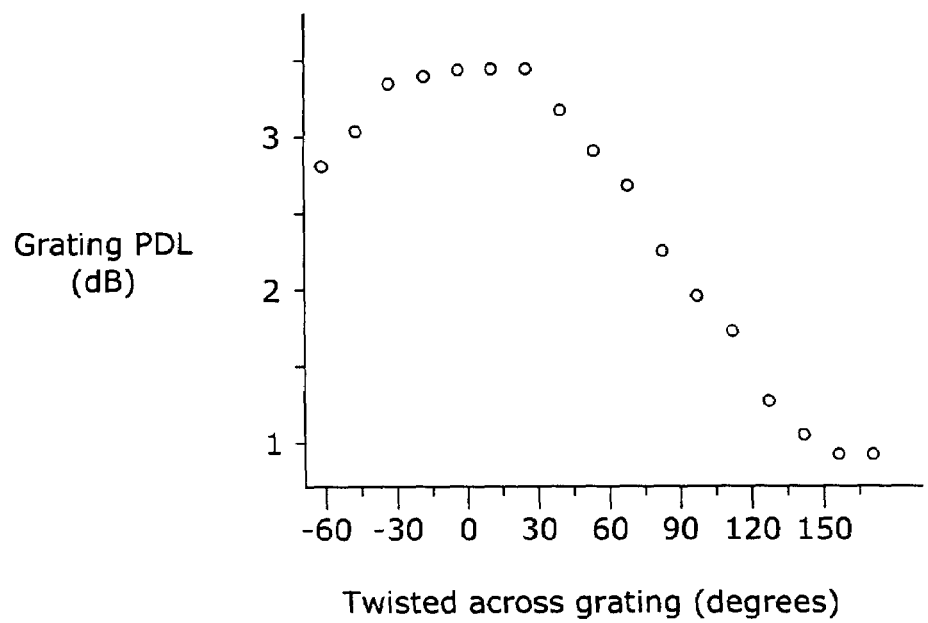
FIG. 9 is a graph illustrating polarization dependent loss as a function of twist angle for a tunable PDL element of the present invention.

FIG. 8 illustrates the grating transmission spectrum associated with a particular tunable PDL element formed in accordance with the present invention. In particular, a highly tilted grating was UV inscribed into a fiber core using a tilted phase mask. The tilt of the grating was approximately 45°, and the period A of the grating was controlled to be approximately 1.07 $\mu$m. The length of the inscribed grating was 3 cm. As shown in FIG. 8, the transmission of unpolarized light drops over a wavelength region of less than 1400 nm to about 1500 nm, while then remaining relatively flat over a wavelength range of 1500–1600 nm, then rising again from 1600 nm to approximately 1700 nm. In accordance with the teachings of the present invention, the polarization dependent loss is affected by rotating (twisting) one or both ends of the grating. FIG. 9 is a graph of the measurement of polarization dependent loss, measured at a wavelength of 1500 nm, as the rotation angle $\theta$ as swept through the value of −60° to over 150°. As shown, the PDL value can be controlled by controlling the twist. For example, a rotation of 90°, as applied to this specific grating is shown to exhibit a polarization dependent loss of approximately 1.8 dB, and then to steadily decrease to a value less than 1 dB as the rotation goes beyond 150° (thus approaching the theoretical limit of 0 dB for a twist of 180°)

The above description is presented to illustrate the operation of various embodiments of the present invention and is not meant to limit the scope of the invention. Indeed, from the above description, many variations will become apparent to those skilled in the art. Thus, the scope of the present invention is intended to be limited only by the claims appended hereto.

What is claimed is:

1. An optical element for providing a tunable mount of polarization dependent loss to an optical signal passing therethrough, said element comprising a section of optical fiber including at least one highly tilted optical grating formed in the core region thereof;

a first rotation element disposed to mechanically hold a first end of the section of optical fiber, said first rotation element for imparting a degree of rotation through a first angle $\theta_1$ to said first end of said optical fiber section; and a second rotation element disposed to mechanically hold a second, opposite end of said section of optical fiber, said second rotation element for imparting a degree of rotation through a second angle $\theta_2$ to said second, opposite end of said optical fiber section, wherein the direction and degree of rotation associated with said first and second angles $\theta_1$ and $\theta_2$ are controlled to provide a desired degree of tuning to control polarization dependent loss.

2. An optical element as defined in claim 1 wherein the arrangement further comprises an index-matching material disposed to surround the section of optical fiber.

3. An optical element as defined in claim 2 wherein the index-matching material comprises a light-scattering material.

4. An optical element as defined in claim 2 wherein the index-matching material comprises a light-absorbing material.

5. An optical element as defined in claim 1 wherein the section of fiber comprises a section of birefringent fiber.

6. An optical element as defined in claim 5 wherein the grating is aligned with the birefringent axis of the birefringent fiber.

7. An optical element as defined in claim 6 wherein the aligned grating is rotated about the birefringent axis to exhibit a large polarization dependent loss.

8. An optical element as defined in claim 1 wherein the rotation is imparted within the grating.

9. The optical element as defined in claim 1 wherein the first and second rotation elements are rotated in the same direction to provide for rotating the principle states of polarization for an optical signal passing through the highly tilted grating.

10. The optical element as defined in claim 9 wherein the magnitude of $\theta_1$ is essentially equal to the magnitude of $\theta_2$ such that the polarization dependent loss associated with the optical element remains essentially constant.

11. The optical element as defined in claim 1 wherein the first and second rotation elements are rotated in the opposite direction to maintain essentially the same principle states of polarization.

12. The optical element as defined in claim 11 wherein the magnitude of $\theta_1$ is essentially equal to the magnitude of $\theta_2$ such that polarization dependent loss is reduced as the rotation is imparted.

13. The optical element as defined in claim 12 wherein the polarization dependent loss becomes essentially zero as the difference between $\theta_1$ and $\theta_2$ approaches 180°.

14. The optical element as defined in claim 1 wherein one rotation element remains fixed, with a rotation $\theta=0$.

15. The optical element as defined in claim 1 wherein the highly tilted optical grating is tilted at an angle of approximately 45° with respect to the optical axis of the section of optical fiber.

16. The optical element as defined in claim 1 wherein the element further comprises at least one detector for receiving out-coupled radiation from the optical signal passing through the highly tilted optical grating for measuring the polarization properties of the out-coupled signal.

17. The optical element as defined in claim 16 wherein the detector comprises a reflective surface disposed alongside the highly tilted grating to reflect a portion of the out-coupled signal into a photodetector disposed adjacent to said fiber.

18. The optical element as defined in claim 17 wherein the reflective surface is parabolic.

19. The optical element as defined in claim 17 wherein the reflective surface is elliptical, with the optical axis of the highly tilted grating disposed at a first focal point and a photodetector disposed at a second focal point.

20. The optical element as defined in claim 1 wherein the first and second rotation elements provide sufficient rotation to create a polarization dependent loss such that the optical element polarizes the light propagating through said optical element.

21. An optical arrangement for providing tuning of the principle states of polarization and polarization dependent loss of an optical signal, the arrangement comprising a cascaded plurality of tunable polarization dependent loss elements, each element comprising a section of optical fiber including a highly tilted optical grating formed in the core region thereof;

a first rotation element disposed to mechanically hold a first end of said section of optical fiber, said first rotation element for imparting a degree of rotation through a first angle $\theta_1$ to said first end of said optical fiber section; and a second rotation element disposed to mechanically hold a second, opposite end of said section of optical fiber, said second rotation element for imparting a degree of rotation through a second angle $\theta_2$ to said second, opposite end of said optical fiber section, wherein the direction and degree of rotation associated with said first and second angles $\theta_1$ and $\theta_2$ are controlled to provide a desired degree of tuning to control polarization dependent loss.

22. The optical arrangement as defined in claim 21 wherein the rotation is imparted in at least one of the gratings.

23. The optical arrangement as defined in claim 21 wherein at least a portion of the optical fiber comprises birefringent optical fiber.

24. The optical arrangement as defined in claim 21 wherein in the cascaded structure, the second rotation element of a first tunable polarization dependent loss element is used as the first rotation element of a subsequent, cascaded polarization dependent loss element.

25. The optical arrangement as defined in claim 21 wherein in the cascaded structure separate rotation elements are used for each tunable polarization dependent loss element.

26. The optical arrangement as defined in claim 21 wherein at least one rotation element remains motionless, with $\theta=0$.

27. A method of adjusting the polarization dependent loss of an optical signal propagating along an optical fiber, the method comprising the steps of:

a) providing a section of optical fiber including a highly tilted optical grating formed in the core region thereof;

b) passing the optical signal through said highly tilted optical grating; and c) rotating, about the optical axis, a first end of the section of optical fiber through an angle $\theta_1$ and a second, opposing end of said section of optical fiber through angle $\theta_2$, with the rotations controlled to reduce polarization dependent loss in the optical signal passing through the highly tilted optical grating so as to out-couple a portion of the optical signal passing therethrough; and d) measuring the out-coupled signal and adjusting the rotations provided in step c) to continue to reduce the polarization dependent loss.

28. The method as defined in claim 27 wherein in perform step c), the rotation is controlled so that $\theta_1=-\theta_2$, so as to reduce the polarization dependent loss in the optical signal passing through the highly tilted optical grating.

29. The method as defined in claim 27 wherein in performing step c), the grating is rotated at each end to form an angular displacement of approximately 180° between the fiber section ends, reducing the polarization dependent loss to essentially zero.

* * * * *